March 11, 1930. J. F. ROBB 1,750,244
MACHINE FOR MAKING UNIFORM CONCRETE
Filed May 9, 1928 9 Sheets-Sheet 1

Inventor
John F. Robb
By Robb & Robb
Attorneys

March 11, 1930. J. F. ROBB 1,750,244
MACHINE FOR MAKING UNIFORM CONCRETE
Filed May 9, 1928 9 Sheets-Sheet 5

Inventor
John F. Robb
By Robb & Robb
Attorneys

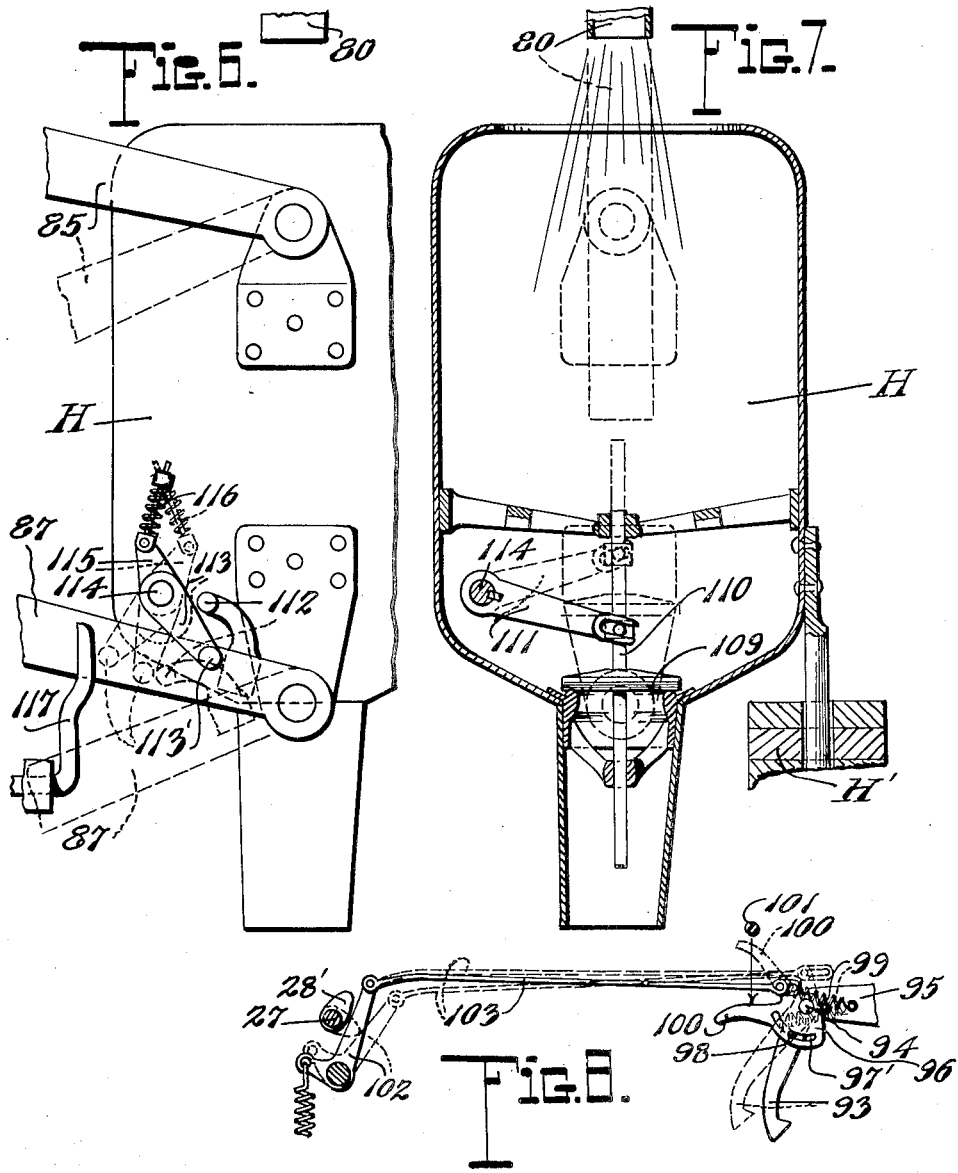

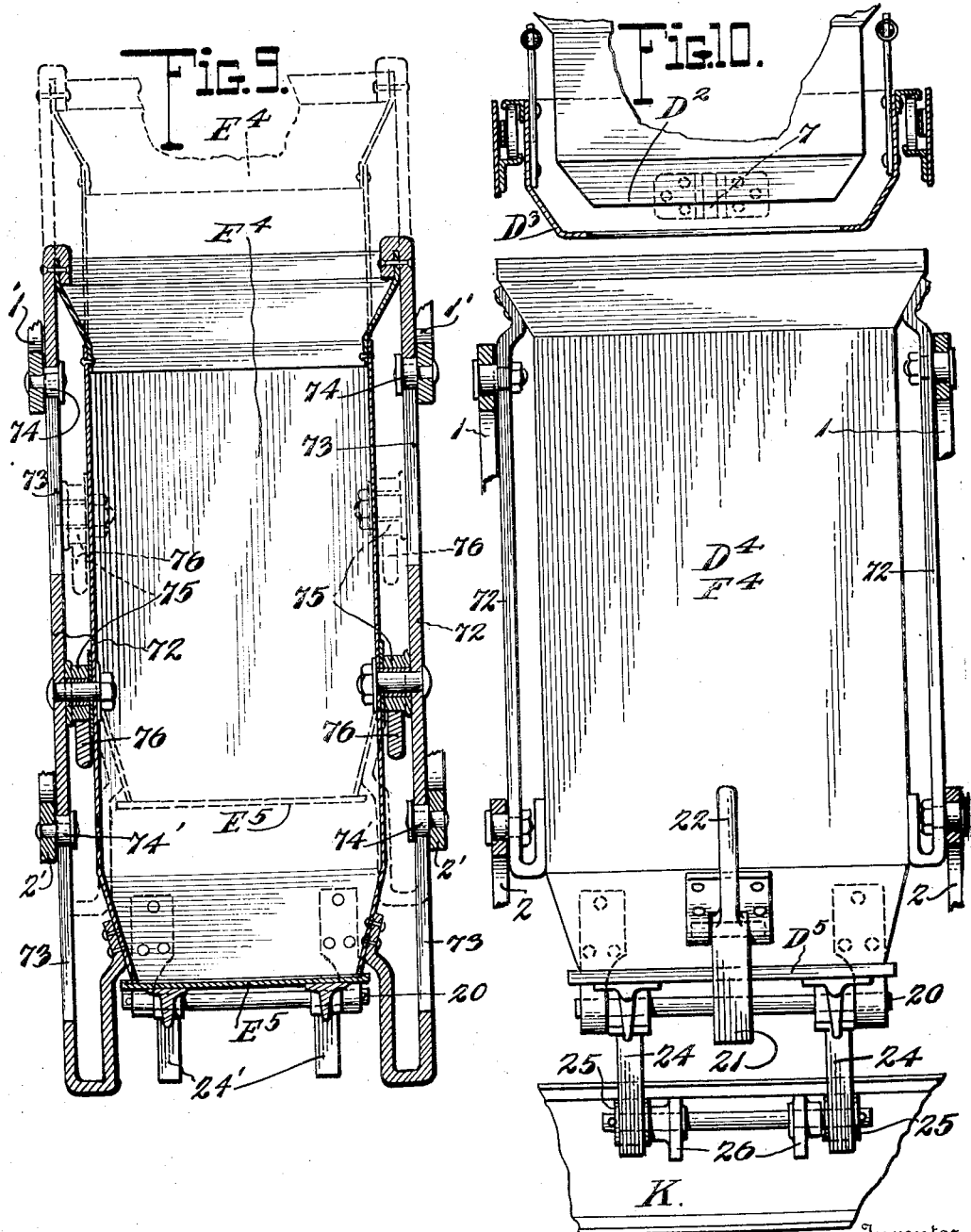

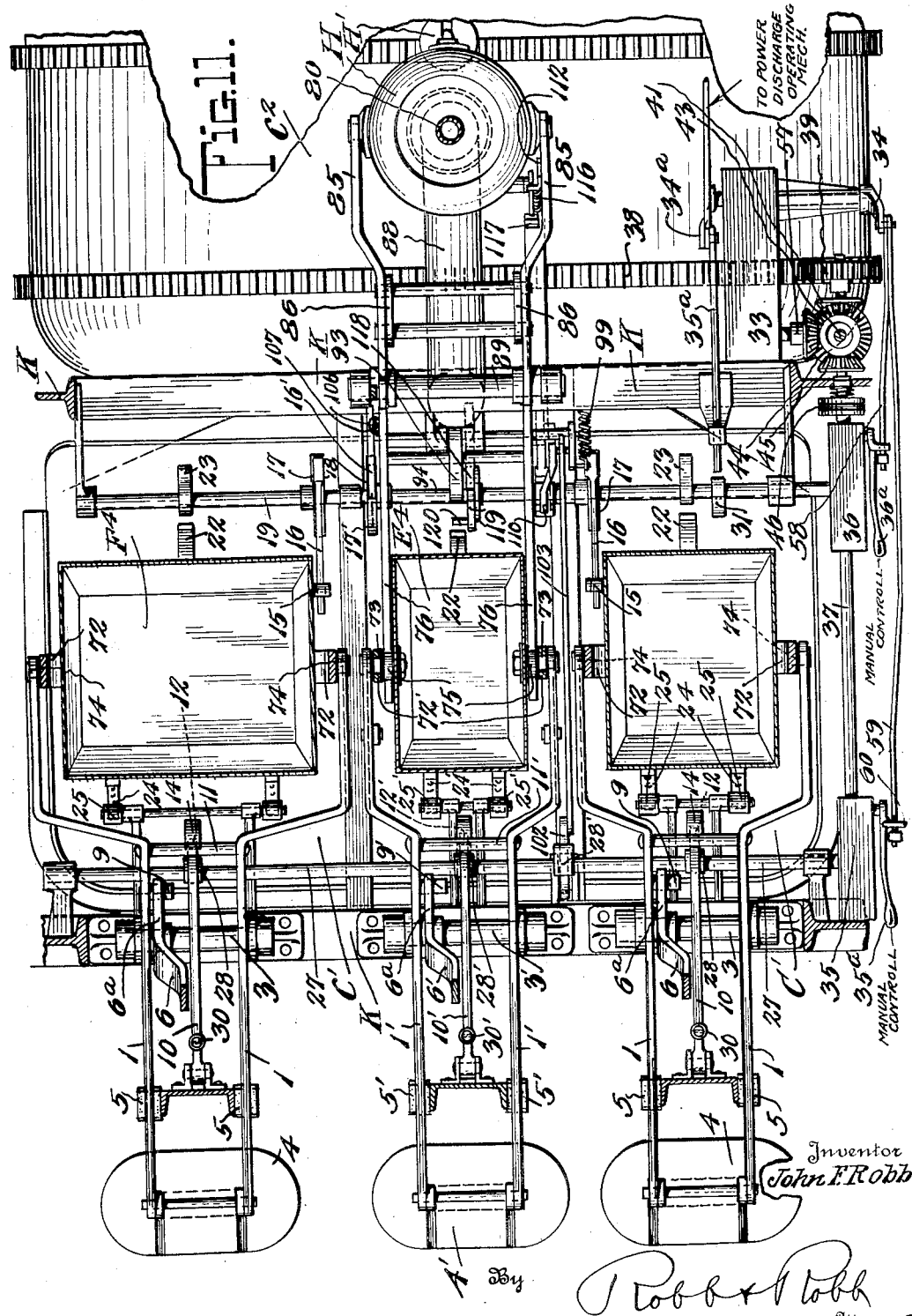

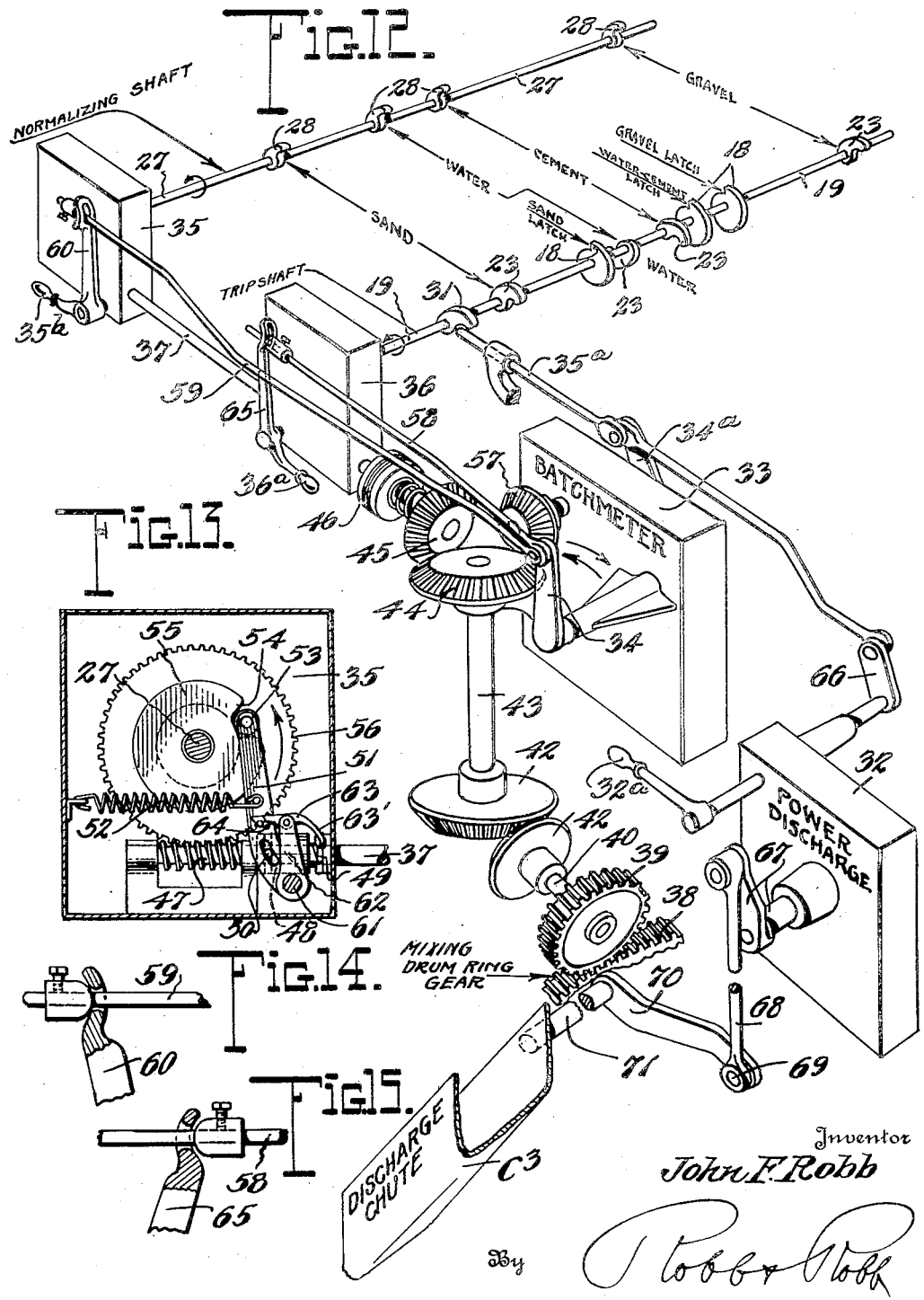

Patented Mar. 11, 1930

1,750,244

UNITED STATES PATENT OFFICE

JOHN F. ROBB, OF CLEVELAND HEIGHTS, OHIO, ASSIGNOR TO KOEHRING COMPANY, OF MILWAUKEE, WISCONSIN, A CORPORATION

MACHINE FOR MAKING UNIFORM CONCRETE

Application filed May 9, 1928. Serial No. 276,363.

The primary objective of my invention has been to produce a machine by which to completely manufacture concrete comprised of the usual mixed aggregates of cement, water, sand, and gravel. A special aim in the development of the invention has been to totally eliminate, in the regular operation of my machine, above proposed, the employment of manual operations. Manual control or controls of different operations of a concrete mixing plant or machine interpose the objectionable human element of control, by which efficiency is usually reduced as compared with control or controls which are entirely mechanical.

My invention is adapted particularly for use as a central mixing plant type of machine but is susceptible of employment in portable or movable apparatus where facilities are had for maintaining a continuous supply of the aggregates that are necessary for the final mixed concrete.

Explaining more fully certain additional objects of the invention, I might say that one great desideratum in the art of producing a homogenous mixed concrete is to cause the various operations of supplying the different aggregates, uniting these aggregates, agitating said aggregates and discharging the aggregates, is to perform the said various operations in mechanical timed relation so that each of the aforesaid actions will take place at the proper moment, and all of them will be coordinated in this manner in order to save time and produce a final mixed concrete in regular quantities or batches, each batch of which is absolutely uniform.

The uniformity of the batches is created by the exact timing of the commencement of the various operations, the exact timing of the length of the operations, and exactness in the timing of the supply and discharge actions relative to the aggregates being handled.

The advantages to be derived in practical commercial operations from producing uniform mixed concrete batches are many. In the first place, the considerable amount of inspection of the operation of the machinery is avoided, because once my machine is set for use and started into operation, since its various actions upon the materials and controlling the materials as to supply and discharge are timed and mechanically performed, it is unnecessary to oversee these actions, for which purposes inspectors are regularly employed on jobs where concrete of high standard mixers is required to be used, as for instance on road paving operations, bridge construction jobs, special building operations using concrete et cetera. The elimination of inspection alone involves an important saving to the state and to the contractor in the supervision of concrete manufacture. From the contractor's viewpoint, the complete mechanical manufacture of concrete is important because machine method is employed to measure and handle all of the aggregates entering into the concrete, and under these conditions a number of employees now required to manually control or operate machinery employed may be dispensed with.

As showing how this works out with my invention, the only employees needed to be used by a contractor are those few who will see that the machines which supply the different aggregates to the supply hoppers or receptacles, are performing their functions, and those who see that the aggregates are discharged into the proper motor vehicles or other transportation or distributing means used to handle the completely mixed aggregates or final uniform product.

It is hardly necessary to remark upon the fact that concrete as a building material is achieving greater and greater universality of use in all types of construction operations and the production of a uniform product with absolute guarding controls to maintain the uniformity of the ultimate mixed product offers the possibility of enormous saving from all sides in the commercial manufacture of the concrete.

In carrying out my invention I utilize supply machinery in the form of conveyors, or the like, to carry the different aggregates used for the concrete, to supply receptacles or hoppers. These conveyors may constantly operate if timed properly to just maintain the supply receptacles filled, or with sufficient contents to always supply certain measuring receptacles as the main machine is in operation. Or, by use of the overseeing operator at the supply end of the plant, the conveyors may be intermittently operated depending upon the requirements of the machine which otherwise mechanically does its work completely.

The materials are automatically fed from the supply receptacles to the measuring receptacles, are automatically measured by the measuring receptacles, are automatically discharged from the latter so as to become united and fed to a mixing or agitating means, and are automatically discharged from the mixing or agitating means at a predetermined time and after the necessary period of mixing to produce the concrete of required integrity.

The mechanisms of my machine are so timed that they work properly in coordination as previously suggested, and they are peculiarly interlocked so that, for instance, after the measuring receptacles are discharged they will be replenished with subsequent measured quantities and the cycles of action of the machine continued again and again as long as it is in operation, without the necessity for manual intervention so far as the controlling of the various mechanisms is concerned.

Consequently, upon the use of a machine of the type which I propose, it is desirable to employ checking controls so that it is impossible for the various measured quantities of aggregates, including water, to be discharged for uniting at the mixing mechanism, unless each aggregate has been properly measured and is ready to be supplied to the place where all the aggregates are united. I use a special means in the nature of a locking control to prevent discharging of the aggregates from their different measuring receptacles when, for any reason, one of the receptacles is not supplied with proper quantities of its aggregate material ready to go into the main batch to be mixed.

I furthermore use a unique and necessary interlocking of controls of said batchmeter, power discharge, aggregate hoppers discharging means, and aggregate hoppers releasing or restoring means, the actions of which will appear more fully as this description proceeds, and upon reference to the drawings annexed hereto in which:

Fig. 6 is a fragmentary side elevation showing the valve actuating and resetting mechanism for the water receptacle.

Fig. 7 is a fragmentary vertical sectional view through the water receptacle showing more clearly the valve mechanism.

Fig. 8 is a detail view of the actuating and setting mechanism for the cement hopper or receptacle latch.

Fig. 9 is a vertical section on line 9—9 of Fig. 5, disclosing certain details of construction of the cement receptacle and associated parts.

Fig. 10 is a view taken on the line 10—10 of Fig. 3, parts being broken away.

Fig. 11 is a horizontal sectional view approximately on the line 11—11 of Fig. 4.

Fig. 12 is a diagrammatic perspective of certain of the operating instrumentalities and control mechanisms.

Fig. 13 is the power operating mechanism for the normalizing shaft.

Figs. 14 and 15 are detail views of the connecting means between the normalizing and trip shaft operating device control levers and the batchmeter.

*General main machine structure*

Figure 1:
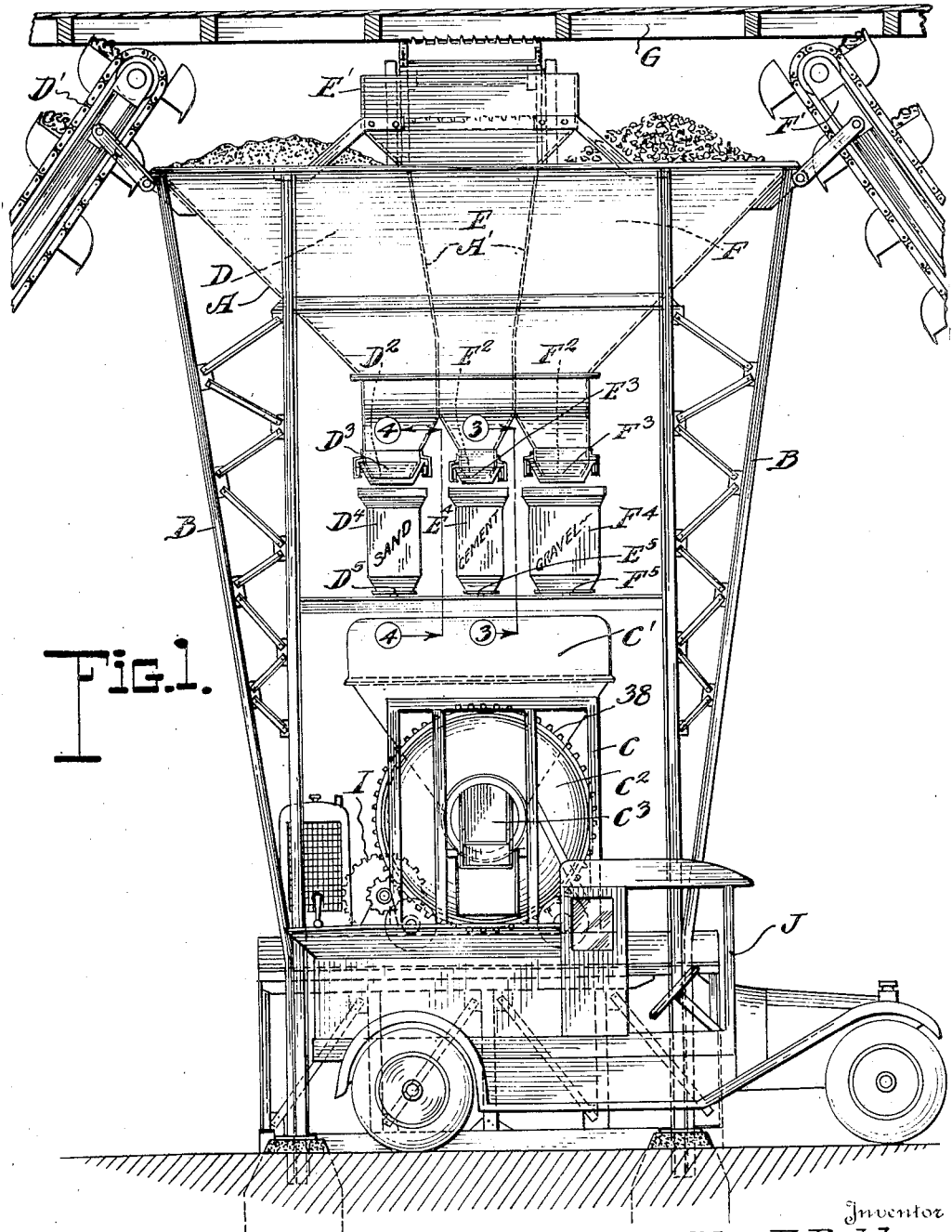
Fig. 1 is a side elevation of a central mixing plant, shown somewhat diagrammatically, and to which my invention may be added.
Figure 2:
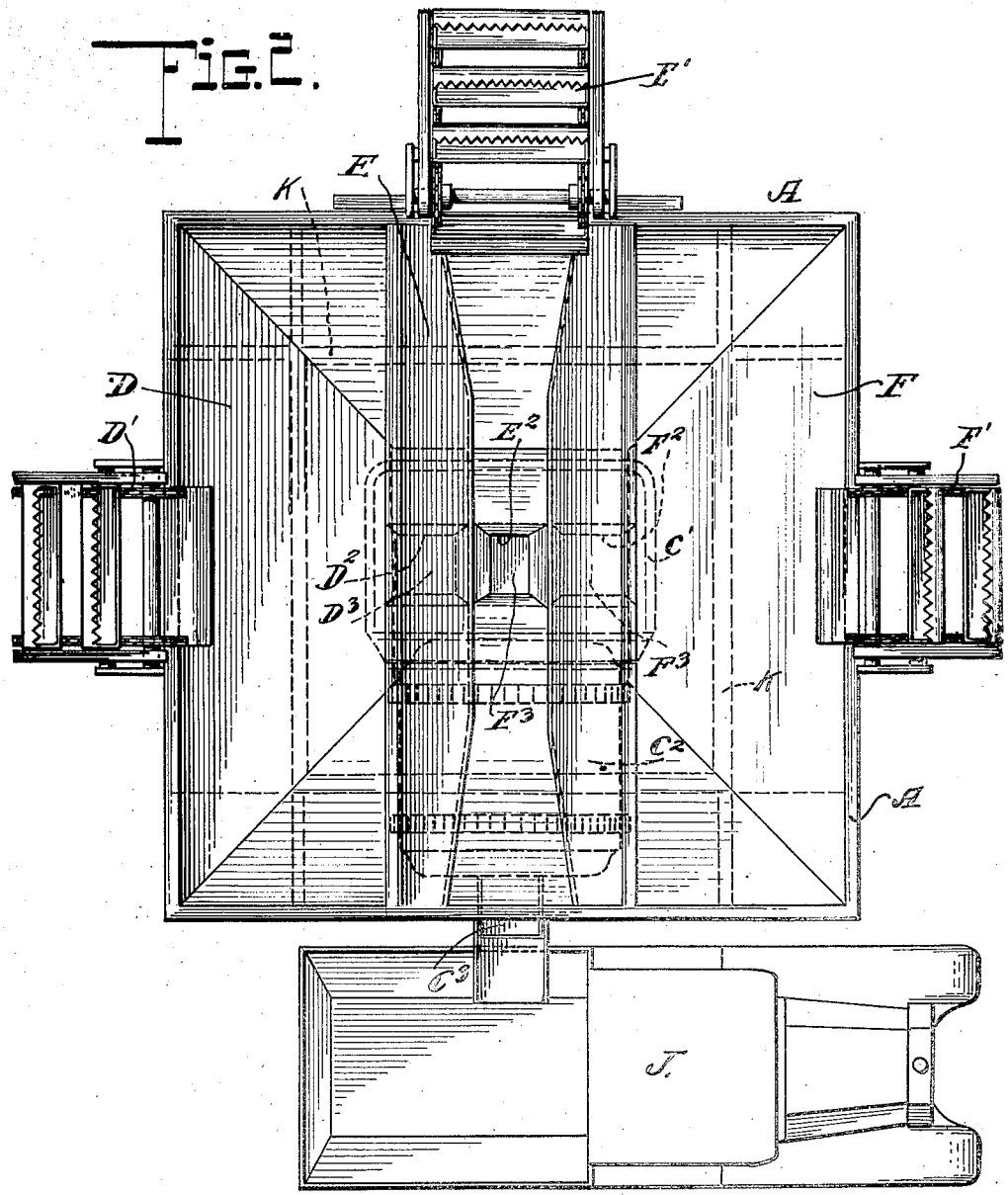
Fig. 2 is a top plan of the parts as shown in Fig. 1.

In the drawings I disclose a central mixing plant which consists of a divided and partitioned receptacle or hopper A supported on suitable truss framework B. A concrete mixing apparatus C is located beneath the hopper A and is adapted to receive, under the control of certain measuring or weighing instrumentalities, the various aggregates necessary to make up the proper batch of concrete.

The hopper A is subdivided by the partitions A—A, into 3 hoppers which are designated as D, E and F, and are adapted to receive sand, cement, and gravel or coarse aggregates, respectively. The three hoppers D, E and F are kept supplied with the proper materials by the conveyors D', E' and F', which may be of any approved type. A roof or cover G is provided to keep out the weather.

Each of the hoppers D, E, and F, taper downwardly to the restricted outlets or openings $D^2$, $E^2$ and $F^2$, and they are provided with control gates or valves $D^3$, $E^3$ and $F^3$ respectively.

Suspended below each of the respective valves is its respective weighing hopper $D^4$, $E^4$ and $F^4$, provided with doors $D^5$, $E^5$ and $F^5$. These doors are adapted to be tripped as will later be described and dump the contents of the weighing hoppers $D^4$, $E^4$ and $F^4$ into the mixer C.

The mixer C consists of a mixing drum suitably power driven by an engine, not shown, through the gearing I.

The materials from the weighing hoppers or receptacles $D^4$, $E^4$ and $F^4$, and the water receptacle H, discharge into the usual hopper C' of the usual construction into the mixing drum $C^2$ and after being properly mixed for the required interval of time are discharged by the chute $C^3$ into any receptacle, or as shown in the drawings, into the truck J by which it may be carried to the construction job. However, any suitable conveyor for this purpose may be availed of depending largely on where the place of use of the concrete is located.

The weighing instrumentalities for the different aggregates are somewhat similar in character, and since the apparatus which handles the sand or fine aggregates are similar with the exception of capacity, to the gravel hopper, or coarse aggregate weighing mechanism, only one of these will be described.

The cement weighing mechanism is provided with means which cooperate so that after the cement has been weighed the water required for the mixture is weighed against the cement. The reason I employ the system of weighing the cement in relation to the water is to obtain the advantages of the use of the method now known in commercial practice as the cement water ratio method of control and measurement of water employed for the mixed batch. Since, however, I am mechanically determining the quantities of all of the aggregates with an exactness which has heretofore not been obtainable in any prior machines, it is not so necessary to utilize the cement water ratio because the water might be weighed in other case, or if weighing is not resorted to the water may be measured by volume instead of weight by suitable accurate means that I could readily devise as an equivalent to the mechanism employed herein. It will therefore be understood that I consider myself entitled to avail of different methods of measuring the water or cement to secure the desired quantities, and my claims are to be read in the light that they cover a combination of mechanisms rather than in the light of being directed to any one specific mechanism unless the claims themselves so provide.

In fact, in order that the sand or other solid aggregates used with my machine may be of absolutely uniform weight, I may employ in conjunction with the conveyors D' E' and F' heating devices or a suitable sheet flame directed against the conveyors, which may be metal, thereby to heat the aggregate as it is supply to the machine and do away with the necessity of calculating the amount of moisture which may be contained in certain of these aggregates, such as the sand or gravel. This moisture is known to vary the requirements of the amount of water necessary to be used in the ultimate mixture of aggregates to be agitated for the crystallization of the cement, and for facilitating the coating of the large aggregates with the cementitious binder produced in the mixing operation.

Certain latches and safety devices are provided so that should any of the receptacles not contain or receive the required quantity of materials, the mechanisms will be locked to prevent an improper mixture from being dumped into the mixing drum.

*The sand weighing mechanism*

Figure 3:
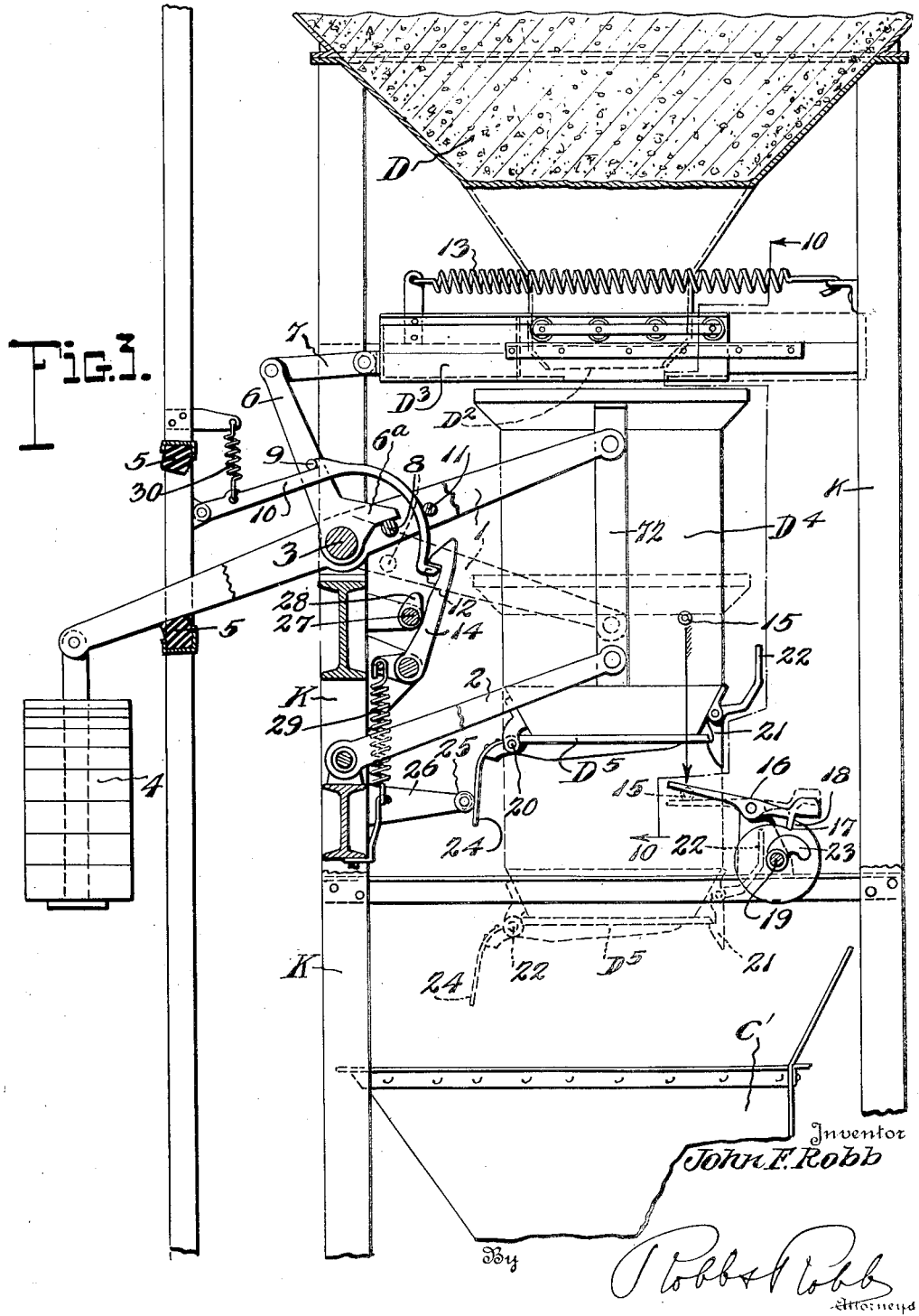
Fig. 3 is an enlarged sectional view on line 3—3 of Fig. 1 showing my invention applied thereto.

The sand weighing and measuring mechanism is best disclosed in Fig. 3 and includes the hopper $D^4$ which is supported in spaced relation to the support K by the scale beams 1 and like members 2. The beam 1 extends beyond its pivot or fulcrum 3 and carries counter-weight 4 equal to the weight of the receptacle $D^4$, and the quantity of sand required. Resilient buffers 5—5 are provided to absorb some of the shock as the scale beams 1 move to their extreme positions. The shaft 3 on which the beam 1 is pivoted carries the lever 6 which is connected by the link 7 to the cut-off slide or valve $D^3$.

The lever 6 has an arm $6^a$ adapted to cooperate with a projection 8 as the counter weight raises the receptacle to filling position; as this position is reached the projection 9 on the lever 6 is engaged by the latch member 10, the cut-off slide now being in filling position. When the required amount of the aggregate falls into the receptacle $D^4$ and the weights 4 are overbalanced, the scale beam rocks, the parts shifting to the dotted line positions of Fig. 3 and Fig. 4. A projection 11 on the scale beam 1 at this time engages the shoulder extremity of the latch 10 releasing the pin 9 on the lever 6 from said latch, whereupon the spring 13 will cause the cut-off slide or valve $D^3$ to be quickly moved to right, cutting off the flow of aggregate from the main hopper D. As the cut-off valve reaches its extreme closed position the arm $6^a$ of the lever 6 will engage the projection 8 causing the beam 1 to be rocked further. The projection 11 will now be engaged by the holding latch member 14. As the receptacle $D^4$ descends due to its contents overbalancing the counter-weights 4, a roller projection 15 will engage the tail of the safety latch 16 causing this latch 16 to be rocked and move the nose 17 out of the path of the abutment 18 which is fixed to the trip shaft 19.

It must be understood that there are three of these safety devices, one for the sand, one for the gravel, and one for the combined cement and water handling mechanism, so that in order for the trip shaft 19 to be released so that the receptacles D⁴ E⁴ F⁴ and H can be emptied it is necessary that all of these safety latches, similar to 16, be released.

The door D⁵ of the receptacle D⁴ is hinged at 20, and is held in closed position by the latch 21. This latch 21 is provided with the tail 22 which moves down into position to be struck by the cam 23 on the shaft 19, when this shaft is rotated.

Closing springs 24 are provided for the doors D⁵ E⁵ and F⁵ of the sand, cement, and gravel receptacles D⁴ E⁴ and F⁴, respectively. These closing springs 24 are adapted to engage the rollers 25 on the brackets 26 projecting from the supporting frame K, as the open receptacles are returned to their filling positions, and thereby swing the doors D⁵ E⁵ and F⁵ are closed, whereupon the latches 21 will engage and hold the said doors closed.

It should be noted that as the receptacles D⁴ and F⁴ receive the required quantity of material they move down to their dumping positions, and are latched down in these positions, and remain down until they are released by the rotation of the normalizing shaft 27 causing the cams 28 to engage the latch 14 thus swinging them out of engagement with the pins 11, whereupon the counter-weights 4 which are much heavier than the emptied receptacles will swing the beams 1 upward for raising the receptacles to filling positions. The projections 8 on the beams 1 will now engage the arms 6ᵃ of the levers 6, swinging these levers to the left, and since the links 7 are connected to the extremity of the levers 6, and the cut-off slides D³, these slides will be moved to the left, again allowing the material to run from the hoppers to the weighing receptacles.

As each weight 4 descends and the lever 6 moves to cause refilling of the receptacle the projection 9 engages the latch 10, latching the cut-off slide in open position. A spring 29 is provided for the latch 14 to hold it in proper relation to engage the pin 11. A spring 30 is provided for the latch 10 to support said latch in proper cooperative relation with its associated parts.

*General operation of sand measuring means*

Figure 4:
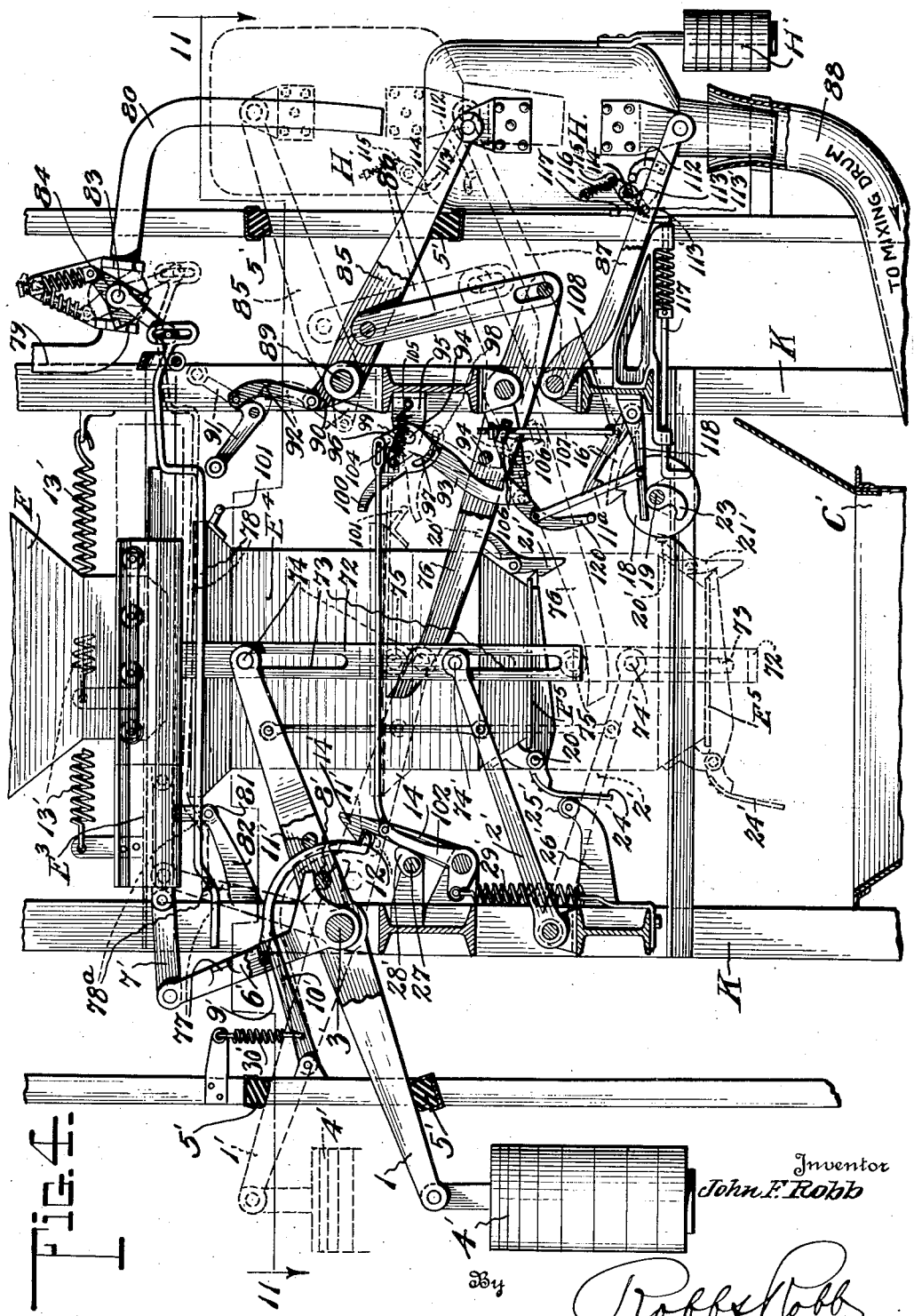
Fig. 4 is an enlarged sectional view on the line 4—4 of Fig. 1. Dotted lines indicate positions of cement weighing hopper when filled.

The general operation of the sand measuring or weighing unit as shown in Fig. 4 is as follows,—with the parts as shown in full lines—sand will flow into the receptacle, D⁴ until its weight, plus the weight of the receptacle, causes the said receptacle to descend, thus rocking the beam 1 to the position as shown in dotted lines. As this dotted line position is reached the beam 1 is latched down by the engagement of the latch 14 with the projection 11. The cut off slide having been either simultaneously or just previously released by the projection 11 engaging the latch 10 and rocking the said latch downward to disengage from the pin 9 on the lever 6. The receptacle in its descent (to the dotted line position) rocks the safety latch 16 freeing the shaft 19 from its particular safety latching mechanism. The latch 21 for the door D⁵ is now in position to be actuated by the cams 23 as the hopper D⁴ is now down. At the proper time, after all of the receptacles and the water tank H have been filled with the required amounts of materials the shaft 19 is caused to make a complete rotation. Due to the cams 23 carried thereby this shaft will actuate the latches 21, thus releasing the doors of the receptacles allowing the contents to empty into the hopper C and mixing drum C² of the mixer C.

The rotation of the shaft 19, see Fig. 12, causes the cam 31 to again operate the power discharge mechanism 32 which is of any known construction. This turns the discharge chute C³ to non-discharging position and simultaneously sets the batchmeter 33 also of known construction.

As the batchmeter 33 is set, the control arm 34 moves to the right actuating the shaft rotating mechanism 35, a sectional view of which is shown in Fig. 13. This mechanism is similar to the mechanism in the casing 36 for rotating the shaft 19.

As the normalizing shaft 27 is rotated one revolution by the mechanism 35, the cams 28 swing the latches 14, releasing the projections 11 on the beams 1, allowing the counter weights 4 to descend and bring the receptacles into their filling positions again. As previously described the projections 8 will engage the arms 6ᵃ of the levers 6 causing the cut-off slides D³, E³, F³, to again establish communication between the receptacles and their respective hoppers D, E, and F. The shaft rotating mechanism 35 includes the shaft 37 which is driven from the ring gear 38 of the mixing drum C² through the pinion gear 39, shaft 40, bevel gears 41—42, vertical shaft 43, bevel gears 44—45, and friction clutch 46. Freely rotatable on the shaft 37 is a worm 47 having a clutch 48 splined thereon. The shaft 37 has an opposing clutch element 49 thereon, which is adapted to be engaged by the clutch 48, to establish driving relation between the shaft 37 and the worm 47. The shifting clutch 48 carries the clutch shifter collar 50, which is engaged by the actuating lever 51 normally held in inoperative position by the spring 52 when the roller 53 is seated in the notch 54 of the control disc member 55.

The worm 47 meshes with the worm wheel 57 carrying the notched disc 55. The shaft 27 is secured to this work wheel 56 and disc 55 to rotate therewith, by a key or otherwise.

The batchmeter 33 which is power driven from the mixing drum by the bevel gear 57 and previously referred to shafts 40, 43 and gears 38, 39, 41, 42, and 44, has the actuated lever 34 to the extremity of which are fastened the two actuating rods or links 58 to engage the roller 81, lifting the rod clear of the projection 77, so that the rod is free to be returned when sufficient water has been run into the tank H.

The valve 83 is provided with any type of spring "snap over" mechanism such as disclosed at 84 to produce a quick cut-off and turning on of the water from the supply 79 to the tank.

The door E⁵ is tripped and closed in the same manner as the sand receptacle, by one of the cams 23 and the rollers 25' on the bracket 26' engaging the spring arm 24'.

The tank H is swingingly mounted on the scale beams 85 operatively connected by the links 86 to the beam or arm 76. Supporting links or arms 87 support the tank in proper relation to the discharge pipe 88 leading into the mixing drum. The lever 85 is pivoted at 89 and carries the extension 90 adapted to actuate the lever 91 through the link 92, the lever thus shifting the rod 78 to the left causing the shifting of the spring "snap over" mechansm 84 to move the water supply valve 83 to cut off the inflow of water into the receptacle or tank H, after the weight of the water supplied thereto has over-balanced the cement which had been previously dumped into the receptacle E⁴. This action is caused by the descent of the tank H from the full line position as shown in Fig. 5 to the dotted line position of same figure of the drawing.

Since in this cement-water measuring mechanism the receptacle has a primary and secondary movement it is necessary to provide a special type of latch mechanism for the water scale beam 76 so said beam will not be latched in the primary shifting movement.

In the initial position, Fig. 4 shows the cement receptacle E⁴ raised and the water receptacle H lowered. Dotted lines the same figures show the cement receptacles E⁴ lowered as in filled position and the water receptacle H raised. In this position water starts to flow into water receptacle H. This is what might be called the primary movement.

Figure 5:
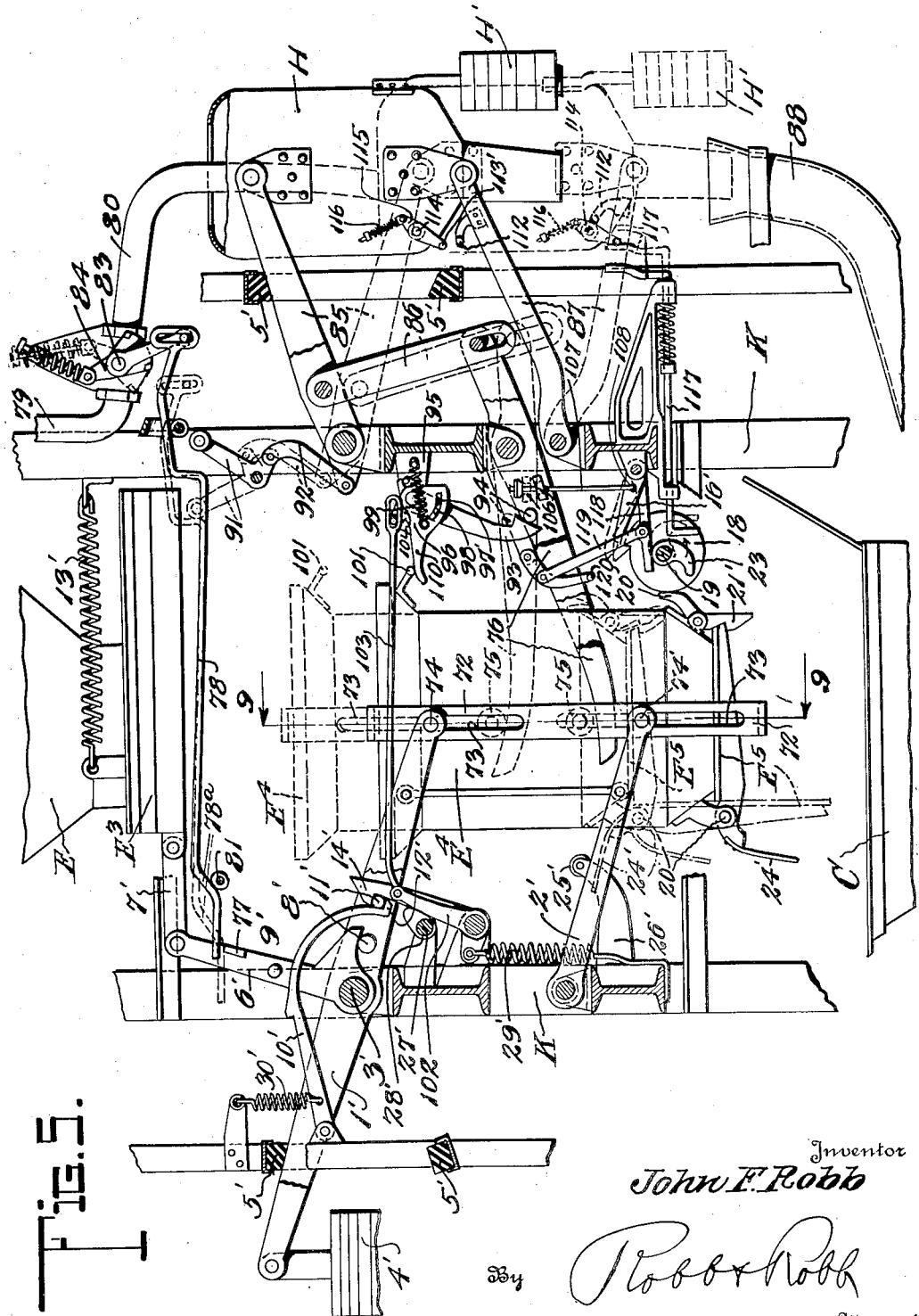
Fig. 5 is a view of the parts as shown in Fig. 4 but showing the position of the weighing hopper for the cement in full lines when filled and showing in dotted lines the position after the water receptacle has been filled and weighed against the contents of the cement receptacle.

Fig. 5 illustrates the same arrangement in full lines as shown in dotted lines of Fig. 4. Fig. 4 in full lines shows what might be called the secondary movement positions of the parts, and it is during this movement that the latch 93 for the water scale beam must function to hold the water tank in the dotted line position of Fig. 5, (until released by the normalizing mechanism).

The water scale beams 76 are provided with the projection or cross rod 94 adapted to be engaged by the latch member 93 under certain conditions. The latch member 93 is pivoted at 94 to the bracket 95 supported by the main frame K. An actuating segment 96 for the latch 93 is also pivoted at 94 and provided with a slot 97 into which projects the pin 98, said pin being fixed to the latch 93.

The segment 96 is provided with an actuating or shifting spring 99 to hold the said segment in either of its shifted positions. The segment 96 also has projecting therefrom the tail 100 adapted to be engaged by the projection 101 on the receptacle E⁴ as said receptacle moves downward during its primary movement. The normalizing shaft 27 is provided with the cam 28' which shifts the arm 102 moving the rod 103 to the right, said rod being operatively connected to an arm 104 of the segment 96 to move the segment by the action of the "snap over" spring 105 and the latch 93, to the unlatched or inoperative position during the normalizing movement.

The scale beam 76 also carries the ear or aperture projection 106 which cooperates with the safety latch through the headed rod 107, one end of which is pivoted at 108 to the latch and the other end is passed through the ear 106.

After the mechanism is normalized it is true that this safety device is in released position. The other two safety devices for the sand and gravel will prevent any operation of the trip shaft 2; and by the time that either of these (sand and gravel) devices is released this (cement and water) safety device will be caused to function.

The water tank H carries separate weight members H' which may be varied by adding or removing to change the proportions of the cement-water ratio.

The tank H is shown in detail in Figs. 6 and 7 and is provided with the valve 109 mounted on the stem 110 and shiftable by movement of the actuator 111 to open and discharge the tank H, or close the tank opening prior to filling of the same. This closing action is automatic.

The link arm 87 is provided with the projection 112 which cooperates with the arm 113 fixed to the shaft 114 to which the actuator arm 111 is keyed. This shaft is mounted in any type of well known packing glands or stuffing box so as to make water tight. The arm 113 of the shaft 114 also has fixed thereto the arm 115, provided with the spring "snap over" and holding mechanism 116.

In Fig. 6 the valve is in the open position when the arm 113 is in the full line position. As the tank H rises after being released by the normalizing shaft cam the swinging of the link 87 will cause the projection 112 to swing the arm 113 to the dotted line position, and the snap-over spring 116 will cause the valve arm 113 and valve 110 to snap closed.

As the tank descends in filled condition, the lateral pin extension 113' of the arm 113 will move into position to be released by one of the normalizing shaft cams 23 through the actuating rod 117. As the trip shaft is rotated the cam 23' will lift the pivoted lever 118 and the link 119 will be caused to actuate the release lever 120 which in turn releases and 59, leading respectively to trip shaft and normalizing shaft power rotating mechanisms 36 and 35. As the batchmeter is "set" by the cam 31 on shaft 19, the lever 34 on the batchmeter is caused to move to the right which rocks the lever 60 of the normalizing mechanism 35 through the link 59.

This lever 60 is keyed to the short shaft 61 and said shaft 61 which carries the lever 62, pivoted to the end of which is the latch 63. The latch 63 engages the pin 64 of the lever 51 and when the shaft 61 is rocked the lever 51 will be moved to disengage the roller 53 from notch 54, at the same time engaging the clutches 48 and 49 and setting in motion the worm gear 56. Further swinging movement of the lever 60 will cause the tail 63 of the latch 63 to impinge the wall of the casing 35 rocking the latch 63 to disengage it from the pin 64. The lever 51 however cannot return to disengage the clutch members 48—49 due to the notch 54 having moved away from opposite the roller 53, the lever 51 now being held by the engagement of the roller 53 upon the circular periphery of the disc 55.

After the disc has made one revolution the notch 54 will again be in position to receive the roller 53, and the spring 52 will cause the lever 51 to swing to the left thus disengaging the clutch elements 48—49 and arresting further rotation of the shaft 27. The power mechanism 36 for the trip shaft 19 operates similarly to the just described mechanism 35.

As the batchmeter 33 "trips off" at the end of the mixing period the lever 34 is rocked to the left returning the rod 58 which engages the lever 65 on the shaft rotating mechanism 36. The operation of this mechanism is identical with that as previously described in relation to the mechanism 35 though the parts in casing 36 are reversed.

Should, for any reason, one of the aggregate bins be empty, and a measuring receptacle fail to descend, its particular safety latch 16 would not be released, and by its engagement with its disc 18 on the shaft 19, the shaft would not be permitted to rotate, and under these conditions the shaft 37 would remain stationary, the friction clutch 46 permitting this action.

The power discharge 32 is controlled from the batchmeter 33 by the lever 66 and is so designed as to cause one half of a revolution of the shaft and crank 67 each time the lever 66 is moved to the right or left. As the batchmeter is set by the cam 31 on the shaft 19 the lever 66 is moved to the right and as the batchmeter trips off at the end of ahe mixing period the lever 66 is moved to the left.

Oscillating movement is transmitted from the lever 67 to the discharge chute C³ by the link 68 which is pivoted at 69 to the arm 70 carried by the actuating shaft 71 on which is mounted the discharge chute C³.

Having now described the construction of the central automatic mixing plant briefly and described in detail the construction of the mechanisms for handling the sand aggregate, and the general control mechanism, also the cycle of operation of the above mechanisms, I will now describe the combined cement and water supply mechanisms.

*Cement and water supply mechanisms*

The gravel or coarse aggregate mechanism is quite similar to the sand or fine aggregate supply means and need not be described, therefore being practically duplicates.

Referring now to Fig. 4 we see the cement and water receptacles. The parts which are similar to the other mechanisms will be indicated with like reference numerals, except possibly the additional use of prime marks associated with the numbers.

The receptacle E⁴ is supported by the beam 1' and counter weights 4', similar to the previous mechanism described except that the receptacle E⁴ is capable of vertical movement, independently of the beam 1'. The receptacle E⁴ has fastened to opposite sides thereof the bars 72, each provided with the slots 73 adapted to receive the rollers 74 and 74'. The receptacle or hopper E⁴ is provided with the rollers 75 which normally rest and impinge against the beams 76 of the water supply weighing mechanism as shown on the right hand portion of Figs. 4 and 5 of the drawings.

The counter weights 4' are of such a weight as to equal the required amount of cement. As the receptacle is filled with the required amount of aggregate the beam 1' is rocked to the right lowering the receptacle until it reaches the dotted line position of Fig. 4, the rollers 75 cause the water scale beam 76 to be rocked to the left to bring the water receptacle H into the dotted line or filling position of Fig. 4.

The lever 6' has a lateral projection 77 thereon and is adapted to move the water control valve rod 78 to the right turning on the water from the supply pipe 79 into the pipe 80 which discharges into the receptacle H. The rod 78 has an offset or bent portion 78ᵃ adapted to cooperate with the roller 81 supported from the frame K by the bracket 82 when the rod is moved to the right, and it thus raises the end of rod sufficiently to disengage it from the projection 77 on the lever 6'. The lever 6' as it is released from the latch 10 is quickly moved to the right under influence of the spring 13', and the flow of cement into the hopper or receptacle E⁴ is cut off due to the shifting of the cut-off valve member E³. As the lever 6' shifts to the right the lateral projection 77 engages the rod 78 and shifts the same to the right turning on the water valve 83. The final movement of the rod 78 causes the cam or bent portion 78ᵃ the latch 21' for the door E⁵ of the cement receptacle E⁴. This same cam 23' also actuates the rod 117 which in turn swings the lever arms 113 of the water receptacle, causing the valve 109 to be raised thus allowing the contents of the tank H to run into the mixing drum C' through the conduit 88.

*General operation of machine or plant*

Operation of one complete cycle: Assuming that the three bins D, E and F, are filled with their proper aggregates and the cut-off slides D³, E³ and F³ are in the positions shown in Figs. 3 and 4, the aggregates are flowing into the receptacles D⁴, E³, F⁴.

As the aggregates overbalance the counterweights 4 and 4', the scale beams 1 and 1' will rock causing the pins or projections 11—11' to actuate the tails of the latches 10—10', thus disengaging the pins 9—9' and releasing the arms 6—6'. The springs 13—13' will cause the cut-off slides D³, E³, F³ to move to the dotted line positions (Figs. 3 and 4), thus preventing further flow of aggregates into the receptacles D, E, and F. The beams 1 and 1' will be latched down by the engagement of the pins or projections 11—11' with the latches 14—14'.

The sand and gravel receptacles D⁴—F⁴ as they descend to dumping position cause the projecting pins 15 to engage the "safety" latches 16 thus disengaging the noses 17 of the latches from the shoulders 18 of the adjacent discs fixed on the trip shaft 19. The release latches 20 for doors D⁵, F⁵, have thus moved down into position to be tripped by the cams 23 of the trip shaft 19 when said shaft is released and rotated.

The beam 1' of the cement receptacle E⁴ in rocking to the right downward, lowered the receptacle or hopper E⁴ to the dotted line position of Fig. 4, the projection 77 on the arm 6' engaging the end of the rod 78 and moving the rod to the right thus causing the water control valve 83 to be operated to start flow of water into the tank H, which is now elevated as in dotted lines Fig. 4, or full lines of Fig. 5. The off-set portion 78ª of the rod 78 raises the said rod to permit it to pass over the projection 77 of the arm 6' on its return. Also in descending the receptacle E⁴ by reason of its bracket arm 101 striking the tail 100 of the snap-over mechanism for the water scale beam latch 93, causes this latch to swing into operative position to engage the water scale beam 76 as it swings to the dotted line position of Fig. 5.

As the receptacle E⁴ descended it carried with it the beam 76 thus lowering the safety latch 16' so that the shaft 19 could not be rotated. The beam 76 engages the rollers 75 of the receptacle while the scale beam 1' carries the roller 74 which operates in the slots 73.

As the weight of water being introduced into the tank H equals the required ratio to that of the cement in the receptacle E⁴ the tank H will descend to the dotted line position of Fig. 5. The rod 78 will be shifted to the left by the bell-crank 91 engaging the off-set portion of said rod, said bell-crank being actuated by the movement of the arm 85 extension and the link 92. The supply of water to the tank H will be thus cut off.

As the tank descended with the arms 85, links 87—86, the beam 76 was shifted raising the receptacle E⁴ containing the cement. The ear 106 of the beam 76 lifts the rod 107, causes a release or unlatching of the safety latch 16'. The receptacle E4 moves upward with relation to the scale beam 1', the rollers 74 shifting in the slots 73. The door release latch 20'—21' moves into position to be actuated by the release lever 120. The scale beam 76 being latched in this position by the engagement of the latch 93 with the projection 94.

A change in ratio can of course be effected between the cement and water content by the change of the amount of weights in the two weight elements 4' and H'.

The parts are now in the dumping position and should the shaft 19 be rotated the cams 23 will cause the several receptacles and tank to be discharged into the mixer's feed or supply hopper C'. Operating as an automatic central mixing plant it may be assumed that there is a batch of materials in the mixer and the batchmeter 33 is in operation, (see Fig. 12). At the end of the mixing period the batchmeter 33 "trips off" causing the arm 34ª to be moved to the left, also the arm 34 is shifted to the left, moving the parts to positions as shown in Fig. 12.

The shifting of the arm 34ª causes the power discharge mechanism 32 to function, shifting the discharge chute C³ into position opposite from that shown in Fig. 12 or into discharge position. This effects discharge of the drum C² and the shifting to the left of the arm 34 causes the rod 58 to be shifted swinging the lever 65 of the trip shaft rotating mechanism and effecting a rotation of the shaft 19 and cams 23.

The cams 23 (which may be set to effect any proper sequence of dumping of the aggregates and the water), cause the several receptacles D⁴, and F⁴ the tank H, through their contact with the latches 20—21' of the doors and the valve arm 113, the dumping of the aggregates into the mixer. At the proper period the cam 31 engages the rod 35ª and moves the same to the right, setting the batchmeter and again engaging the power discharge, which swings the discharge chute to non-discharging position as shown in Fig. 12. As the batchmeter is set the arm 34 is moved to the right which will cause a pull on the rod 59 swinging the normalizing shaft rotating mechanism lever 60. The normalizing shaft will be caused to rotate once and its several cams 28 will engage the latches 14—14' and actuator 102 for the latch 93, thus releasing all of the receptacles D⁴, E⁴, and F⁴, and tank H, and owing to their empty condition they will be returned to their initial filling position by the overbalancing weights.

As the counter-weights 4—4' return the beams 1—1', the projections 8—8' will engage the lateral arms of the levers 6—6', swinging them to the left, thus shifting the cutoff slides D³, E³, F³ to again permit the aggregates to fill the receptacles.

In rising, the doors D⁵, E⁵, F⁵ are automatically closed by the hinge spring members 24 and 24' engaging the rollers 25 and 25'. Then one of cams 28 of the normalizing shafts shifts the arm 102 moving rod 103 to the right, actuating the snap-over mechanism of the latch 93, disengaging the latch 93 from the pin 95 and holding the latch in the disengaged position until the receptacle again descends and the projection 104 engages this mechanism to swing the latch to engaging position.

Brief summary of actions in complete cycle of operation

It is noted that there may be occasions where for some reason or other the coordination of operation of various mechanisms may be interfered with requiring that at some time or other a manual operation of the power discharge or of the shaft revolving devices 36 and 35 may be desired or required. For such event I provide manual handle levers 32A, 36A, and 35A associated with the mechanisms 32, 36, and 35 respectively, to enable the desired manual operation should the same have to be resorted to.

Cycle of operation

1. *Mixer discharge.*—Batchmeter operates ofter mixing time period, arms 34—34ᵃ (Fig. 12) move to left. Arm 34 operates power discharge 32— mixer discharged.

2. *Mixer re-supply.*—Trip mechanism 36 after certain time through operation of lever 65 by same left movement of 34, (time sufficient to let mixed materials be discharged from mixing drum), causes turning of shaft 19 to trip latches of doors at once or in desired order and thus discharges hoppers of cement, sand, gravel, water, into mixer through hopper C'.

3. *Batchmeter reset.*—While the action (2) above is taking place, turning of shaft 19 resets the batchmeter by cam 31 and rod 35ᵃ. This should be done coincident with re-supply of charge to mixer.

4. *Discharge rendered non-discharging restoration of hoppers or receptacles to receiving positions.*—When batchmeter is reset, right movement of arms 34 and 34ᵃ cause (a) action of power discharge to restore chute C⁸ to non-discharging position—(b) pull on rod 59 to cause action of rotating mechanism 35 which turns shaft 27 and cams 28 thus push latches 14 and 14' away from 11 and 11' and releasing all locked down receptacles or hoppers D⁴, E⁴, F⁴ and H permitting them to move up under action of their overbalancing weights.

5. *Opening of supply valves to refill hoppers.*—When hoppers D⁴, E⁴, F⁴ and H reach upward limits of movement, levers 6 and 6' open valves D³, E³, F³ for automatic refilling.

6. *Closing supply valves to cut off supply to hoppers.*—When hoppers and water receptacles move down 11 pulls down on latches 10 and springs 13 close the valves D³, E³ and F³.

Having thus described my invention, what I claim as new, and desire to secure by Letters Patent of the United States is:—

1. In a machine for producing uniform mixed concrete, in combination aggregate supply means, an aggregate measuring device associated with each aggregate supply means, discharge means for each aggregate measuring device, mixing means to unite and receive the different aggregates from the several aggregate measuring devices, means to discharge the mixing means, and controlling means for the charging and discharging of the measuring devices coacting to control the charging and discharging of the mixer.

2. In a machine for producing uniform mixed concrete, in combination, different aggregate supply hoppers, aggregate measuring devices associated with said hoppers, a mixing device for receiving measured aggregates from the measuring devices aforesaid, discharge means for causing passing of different aggregates from the supply means to the measuring devices, discharge means for the measuring devices for causing passage of different aggregates to the mixing device, and mechanical control mechanism for operating all of the said parts in proper sequential timed relation, including control instrumentalities for discharging the mixing device, and then rendering said mixing device non-discharging, coacting with the discharge means of said measuring devices.

3. In a machine for producing uniform mixed concrete, in combination, different aggregate supply hoppers, aggregate measuring devices associated with said hoppers, a mixing device for receiving measured aggregates from the measuring devices aforesaid, discharge means for causing passing of different aggregates from the supply means to the measuring devices, discharge means for measuring devices for causing passage of different aggregates to the mixing device, and automatic means for causing continued cycles of operation of the various means and devices hereinbefore mentioned, comprising control instrumentalities common to the mixer discharging and the measuring device discharging means, to govern their action in proper timed relation.

4. In a machine for producing uniform mixed concrete, in combination, different aggregates supply means, measuring receptacles associated with said supply means to receive separate aggregates therefrom and measure their quantities properly in relation to one another to provide a batch of materials of proper proportions, a mixer, means for causing the aggregates measured in the measuring devices to pass to the mixer, means to discharge the mixer after a predetermined mixing period interval of time, automatic control instrumentalities for causing the discharge of the aggregates from the supply means to the measuring receptacles, and discharge of measuring receptacles to supply their contents to the mixer, and for thereafter replenishing the supply of different aggregates in the measuring receptacles, and means for controlling the actions of said various means and devices in timed relation.

5. In a machine for producing uniform mixed concrete, in combination, different aggregates supply means, measuring receptacles associated with said supply means to receive separate aggregates therefrom and measure their quantities properly in relation to one another to provide a batch of materials of proper proportions, including water, a mixer, means for causing the aggregates measured in the measuring devices to pass to the mixer, means to discharge the mixer after a predetermined mixing period interval of time, automatic control instrumentalities for causing the discharge of the aggregates from the supply means to the measuring receptacles, and discharge of measuring receptacles to supply their contents to the mixer, and for thereafter replenishing the supply of different aggregates in the measuring receptacles, and means for controlling the actions of said various means and devices in timed relation, one of the measuring devices being adapted for the measure of cement and cooperating to proportion the cement in relation to the amount of water measured by the water measuring device.

6. In a machine for producing uniform mixed concrete, in combination, different aggregates supply means, measuring receptacles associated with said supply means to receive separate aggregates therefrom and measure their quantities properly in relation to one another to provide a batch of materials of proper proportions, a mixer, means for causing the aggregates measured in the measuring devices to pass to the mixer, means to discharge the mixer after a predetermined mixing period interval of time, automatic control instrumentalities for causing the discharge of the aggregates from the supply means to the measuring receptacles, and discharge of measuring receptacles to supply their contents to the mixer, and for thereafter replenishing the supply of different aggregates in the measuring receptacles, means for controlling the actions of said various means and devices in timed relation, and means for preventing the discharging of the measuring receptacles for supplying their contents to the mixer if a proper measured quantity of material for which a measuring receptacle is normally set is not received by said receptacle, incorrect proportion of the aggregates being thus obviated.

7. In a machine for making uniform mixed concrete, in combination, different aggregates supply means, measuring hoppers associated therewith, weighing mechanism connected with the measuring devices, discharge means for the measuring hoppers, discharge means for the different aggregates supply means, and means for automatically operating the said several discharge means so that the discharge means for the aggregates supply means will be closed when the discharge means for the measuring hoppers are operative, and vice versa.

8. In a machine for making uniform mixed concrete, in combination, different aggregates supply means, measuring hoppers associated therewith, weighing mechanism connected with the measuring devices, discharge means for the measuring hoppers, discharge means for the different aggregates supply means, and means for automatically operating the said several discharge means so that the discharge means for the aggregates supply means will be closed when the discharge means for the measuring hoppers are operative, and vice versa, a mixer to receive the aggregates discharged by the measuring devices, discharge means for the mixer, and automatic control means for causing the operations of the various discharge means above mentioned in timed relation.

9. In a machine for making uniform mixed concrete, in combination, different aggregates supply means, measuring hoppers associated therewith, weighing mechanism connected with the measuring devices, discharge means for the measuring hoppers, discharge means for the different aggregates supply means, and means for automatically operating the said several discharge means so that the discharge means for the aggregates supply means will be closed when the discharge means for the measuring hoppers are operative, and vice versa, a mixer to receive the aggregates discharged by the measuring devices, discharge means for the mixer, automatic control means for causing the operations of the various discharge means above mentioned in timed relation, together with an automatic control means for producing continued cycles of action of the various parts so that the final concrete mixed in the mixer is a uniform product obtained by continuous operations of all of the various mechanisms and devices aforesaid in the same order and in the same timed relations.

10. In a machine for making uniform mixed concrete, in combination, different aggregates supply means, measuring hoppers associated therewith, weighing mechanism connected with the measuring devices, discharge means for the measuring hoppers, discharge means for the different aggregates supply means, and means for automatically operating the said several discharge means so that the discharge means for the aggregates supply means will be closed when the discharge means for the measuring hoppers are operative, and vice versa, a mixer to receive the aggregates discharged by the measuring devices, discharge means for the mixer, automatic control means for causing the operations of the various discharge means above mentioned in timed relation, together with an automatic control means for producing continued cycles of action of the various parts so that the final concrete mixed in the mixer is a uniform product obtained by continuous operations of all of the various mechanisms and devices aforesaid in the same order and in the same timed relations, the supply aggregates supply means including a supply of water and a measuring device for the water associated therewith, and means interrelating the operations of one of the aggregates measuring devices and the water measuring devices, so that the amount of the water is proportioned to the amount of aggregates measured by said particular one of the aggregates measuring devices.

11. In a machine for making uniform mixed concrete, in combination, a series of supply hoppers for solid aggregates, a source of supply of water for mixture with the said aggregates, measuring devices for measuring quantities of solid aggregates and water received from said supply hoppers and water source, into the measuring hoppers for the solid aggregates and water, means for discharging the measured quantities of solid aggregates measured by the measuring hoppers, a mixer arranged to receive the measured quantities of said aggregates and water when discharged from their measuring devices, means for discharging the mixed aggregates agitated in the mixer after a predetermined time of mixing operation, and means for coordinating the operation of said parts and causing these operations consecutively at regularly timed intervals for the purpose described.

12. In a machine for making uniform mixed concrete, in combination, a series of supply hoppers for solid aggregates, a source of supply of water for mixture with the said aggregates, measuring devices for measuring quantities of solid aggregates and water received from said supply hoppers and water source, into the measuring hoppers for the solid aggregates and water, means for discharging the measured quantities of solid aggregates measured by the measuring hoppers, a mixer arranged to receive the measured quantities of said aggregates and water when discharged from their measuring devices, means for discharging the mixed aggregates agitated in the mixer after a predetermined time of mixing operation, and means for coordinating the operation of said parts and causing these operations consecutively at regularly timed intervals for the purpose described, including connections between one of the aggregates measuring hoppers designed to receive cement, and measure it, and the water measuring hopper whereby the amount of water and cement are proportioned to one another in the consecutive operations of the various parts.

13. In a machine for making uniform mixed concrete, in combination, a series of supply hoppers for solid aggregates, a source of supply of water for mixture with the said aggregates, measuring devices for measuring quantities of solid aggregates and water received from said supply hoppers and water source, into the measuring hoppers for the solid aggregates and water, means for discharging the measured quantities of solid aggregates measured by the measuring hoppers, a mixer arranged to receive the measured quantities of said aggregates and water when discharged from their measuring devices, means for discharging the mixed aggregates agitated in the mixer after a predetermined time of mixing operation, and means for coordinating the operation of said parts and causing these operations consecutively at regularly timed intervals for the purpose described, and means for preventing a discharging operation of the measuring hoppers in the regular cycles of action of the machine should for some reason one of the measuring hoppers fail to receive a normally required measured quantity of its particular aggregate.

14. In a machine for making uniform mixed concrete, in combination, a plurality of aggregates supply devices, a plurality of aggregates measuring devices, a mixer to receive materials from the measuring devices, a discharge mixer, discharge means for the aggregates supply devices, discharge means for the aggregates measuring devices, means to coordinate the operation of all of said devices so that the aggregates supply devices automatically feed their aggregates to the measuring devices at a predetermined time, the aggregates measuring devices feed their measured contents of aggregates to the mixer at a predetermined time, and the mixer discharges the mixed aggregates therefrom at a predetermined time, together with automatic control means for said coordinating means.

15. In a machine for making uniform mixed concrete, in combination, a plurality of aggregates supply devices, a plurality of aggregates measuring devices, a mixer to receive materials from the measuring devices, a discharge mixer, discharge means for the aggregates supply devices, discharge means for the aggregates measuring devices, means to coordinate the operation of all of said devices so that the aggregates supply devices automatically feed their aggregates to the measuring devices at a predetermined time, the aggregates measuring devices feed their measured contents of aggregates to the mixer at a predetermined time, and the mixer discharges the mixed aggregates therefrom at a predetermined time, together with automatic control means for said coordinating means, and control mechanism for causing repeated cycles of the operations above specified so that every batch of concrete discharged from the mixer will be of same uniformity of aggregates as a preceding batch.

16. In a machine for making uniform mixed concrete, in combination, a plurality of aggregates supply devices, a plurality of aggregates measuring devices, a mixer to receive materials from the measuring devices, a discharge mixer, discharge means for the aggregates supply devices, discharge means for the aggregates measuring devices, means to coordinate the operation of all of said devices so that the aggregates supply devices automatically feed their aggregates to the measuring devices at a predetermined time, the aggregates measuring devices feed their measured contents of aggregates to the mixer at a predetermined time, and the mixer discharges the mixed aggregates therefrom at a predetermined time, together with automatic control means for said coordinating means, control devices to prevent discharge of the measuring devices to supply their contents to the mixer should any one of said measuring devices not contain a proper measured quantity of aggregate.

17. In a machine for making uniform mixed concrete, in combination, a plurality of aggregates supply devices, a plurality of aggregates measuring devices, a mixer to receive materials from the measuring devices, a discharge for the mixer, discharge means for the aggregates supply devices, discharge means for the aggregates measuring devices, means to coordinate the operation of all of said devices so that the aggregates supply devices automatically feed their aggregates to the measuring devices at a predetermined time, the aggregates measuring devices feed their measured contents of aggregates to the mixer at a predetermined time, and the mixer discharges the mixed aggregates therefrom at a predetermined time, together with automatic control means for said coordinating means, and cut off devices for the aggregates supply devices controlled by movement of the measuring devices.

18. In a machine for making uniform mixed concrete, in combination, a plurality of aggregates supply devices, a plurality of aggregates measuring devices, a mixer to receive materials from the measuring devices, a discharge mixer, discharge means for the aggregates supply devices, discharge means for the aggregates measuring devices, means to coordinate the operation of all of said devices so that the aggregates supply devices automatically feed their aggregates to the measuring devices at a predetermined time, the aggregates measuring devices feed their measured contents of aggregates to the mixer at a predetermined time, and the mixer discharges the mixed aggregates therefrom at a predetermined time, together with automatic control means for said coordinating means, a matchmeter controlling the discharge mechanism for the mixer discharge controlled by the batchmeter, and means cooperating with the batchmeter for controlling the discharge of the measuring devices which supply their contents to the mixer.

19. In a machine for making uniform mixed concrete, in combination, a plurality of aggregates supply devices, a plurality of aggregates measuring devices, a mixer to receive materials from the measuring devices, a discharge mixer, discharge means for the aggregates supply devices, discharge means for the aggregates measuring devices, means to coordinate the operation of all of said devices so that the aggregates supply devices automatically feed their aggregates to the measuring devices at a predetermined time, the aggregates measuring devices feed their measured contents of aggregates to the mixer at a predetermined time, and the mixer discharges the mixed aggregates therefrom at a predetermined time, together with automatic control means for said coordinating means, the measuring devices being movably mounted to facilitate the performance of their measuring function means for locking the measuring devices at a predetermined point in their movement of their measuring operations, and control means for releasing the measuring devices at a predetermined time.

20. In a machine for making uniform mixed concrete, in combination, a plurality of aggregates supply devices, a plurality of aggregates measuring devices, a mixer to receive materials from the measuring devices, a discharge mixer, discharge means for the aggregates supply devices, discharge means for the aggregates measuring devices, means to coordinate the operation of all of said devices so that the aggregates supply devices automatically feed their aggregates to the measuring devices at a predetermined time, the aggregates measuring devices feed their measured contents of aggregates to the mixer at a predetermined time, and the mixer discharges the mixed aggregates therefrom at a predetermined time, together with automatic control means for said coordinating means, the measuring devices being movably mounted to facilitate the performance of their measuring function means for locking the measuring devices at a predetermined point in their movement of their measuring operations, and control means for releasing the measuring devices at a predetermined time, including a batchmeter for causing operation of the discharge of the mixer at a certain time, and a power operating device which actuates the release means of the said measuring devices.

21. In a machine for producing uniform concrete, a plurality of measuring receptacles for receiving the different aggregates which constitute the mix, means for emptying said receptacles cooperatively associated with all of the receptacles to, under certain conditions, automatically prevent the emptying of said receptacles and, under certain other conditions, to permit the emptying of said receptacles, and a mixing machine associated with said measuring receptacles to receive the contents thereof, properly mix the same, and automatically discharge said mixture.

22. In a mixing machine for automatically producing standardized concrete, aggregate receiving receptacles, weighing means associated with each of said receptacles, means for supplying aggregates to each of said receptacles including cut-off valves, operative connections between said weighing means and said cut-off valves so as to discontinue said supplies after a pre-determined quantity of aggregates have been received by each of said receptacles, dumping means for said receptacles, locking means for said dumping means operatively associated with said weighing means to permit said dumping means to be actuated when a pre-determined quantity of aggregates has been received by all of said receptacles and to prevent said dumping means from being actuated when any of said receptacles has not received its pre-determined quantity, mixing instrumentalities associated with said receptacles to receive the contents dumped therefrom, means for discharging said mixing instrumentalities, means for preventing said discharge until said mixing instrumentalities have properly mixed said aggregates, a connection between said discharge means for the mixing instrumentalities and the dumping means for the receptacles, said connection operable to automatically discharge the contents of said receptacles when said discharge means is moved to non-discharging position.

23. In a mixing machine for automatically producing standardized concrete, aggregate receiving receptacles, weighing means associated with each of said receptacles, means for supplying aggregates to each of said receptacles including cut-off valves, operative connections between said weighing means said said cut-off valves so as to discontinue said supplies after a pre-determined quantity of aggregates have been received by each of said receptacles, dumping means for said receptacles, locking means for said dumping means operatively associated with said weighing means to permit said dumping means to be actuated when a pre-determined quantity of aggregates has been received by all of said receptacles and to prevent said dumping means from being actuated when any of said receptacles has not received its pre-determined quantity, one of said receptacles constituting a mixing water receiving means and being operatively associated with another of said receptacles and one of said weighing mechanisms so as to automatically proportion the quantity of water received thereby against the quantity of dry aggregate received by the last mentioned receptacle, mixing instrumentalities associated with said receptacles to receive the contents dumped from all of said receptacles, means for discharging said mixing instrumentalities, means for preventing said discharge until said mixing instrumentalities have properly mixed said aggregates, a connection between said discharge means for the mixing instrumentalities and the dumping means for the receptacles, said connection being operable to discharge the contents of said receptacles when said discharge means is moved to non-discharging position.

24. In a machine for supplying aggregates to concrete mixing machines and the like, a plurality of measuring receptacles, weighing means associated with each of said receptacles for pre-determining the quantity of aggregates received by each receptacle, a liquid measuring container associated with one of the receptacles, means for supplying the liquid into said container including a valve, actuating means for said valve operable by said weighing means to initiate the flow of liquid into said container, connections between said container and said receptacle for utilizing the weight of said receptacle and its contents as a means to proportion the quantity of liquid received by the container, means shiftable by said connections to actuate said valve to cut-off the supply of liquid to the container when the pre-determined quantity of liquid has been received thereby in proportion to a quantity of dry aggregate received by the receptacle, means for dumping the receptacles and discharging said container, and means for preventing said dumping and discharging operation until all of said receptacles and said container have received their pre-determined quantity of aggregates and liquid.

25. In a machine for supplying aggregates to concrete mixing machines and the like, a plurality of measuring receptacles, weighing means associated with each of said receptacles for pre-determining the quantity of aggregates received by each receptacle, a liquid measuring container associated with one of the receptacles, means for supplying the liquid into said container including a valve, actuating means for said valve operable by one of said weighing means to initiate the flow of liquid into said container, connections between said container and said receptacle for utilizing the weight of said receptacle and its contents as a means to proportion the quantity of liquid received by the container, means shiftable by said connections to actuate said valve to cut-off the supply of liquid to the container when the pre-determined quantity of liquid has been received thereby in proportion to a quantity of dry aggregate received by the receptacle, means for dumping the receptacles and discharging said container, means for preventing said dumping and discharging operation until all of said receptacles and said container have received their pre-determined quantity of aggregates and the liquid, and means for restoring said dumping and discharging means to non-dumping and discharging positions after said receptacles or containers have been dumped or discharged.

26. An apparatus for supplying measured quantities of aggregates to concrete mixing machines and the like comprising a plurality of aggregate receiving receptacles shiftable into discharging and non-discharging filling positions, weighing instrumentalities associated with said receptacles to permit said receptacles to shift to discharging position when loaded with a pre-determined quantity of aggregates, said weighing means being adapted to cause said receptacles to shift to non-discharging filling position when empty, and discharging means for said receptacles to permit the emptying thereof after all of the receptacles have shifted to discharging position.

27. An apparatus for supplying measured quantities of aggregates to concrete mixing machines and the like comprising a plurality of aggregate receiving receptacles shiftable into discharging and non-discharging filling positions, weighing instrumentalities associated with said receptacles to permit said receptacles to shift to discharging position when loaded with a pre-determined quantity of aggregates, said weighing means being adapted to cause said receptacles to shift to non-discharging filling position when empty, and discharging means for said receptacles to cause the emptying thereof after all of the receptacles have shifted to discharging position, latch means for co-operating with said weighing means to prevent the return of the receptacle to filling position, and means actuating a said latch means to release said weighing means.

28. In an aggregate supply device for concrete mixers and the like comprising a supply hopper, a measuring receptacle adapted to receive aggregates from the supply hopper, valve means for controlling the passage of aggregates between said hopper and said receptacle, weighing instrumentalities associated with said hopper for proportioning the amount of aggregates receivable therein, said weighing instrumentalities being operatively connected to cause said valve means to discontinue the supply of aggregates from said hopper to said receptacle when in one position and to automatically cause said valve means to establish communication between said supply and said hopper when in another position, means for positively holding said weighing instrumentalities in one of its positions and means to release said holding means to permit said weighing means to automatically shift to its first mentioned position, discharge means for the receptacle, and means to actuate the discharge means operative when the weighing means has shifted to its second mentioned position and rendered inoperative when the weighing means is in its first mentioned position.

29. In an apparatus for supplying properly proportioned quantities of aggregates to concrete mixing machine and the like, a plurality of measuring receptacles, weighing instrumentalities associated with each of said receptacles, separate supply means for said receptacles including a cut-off valve automatically shiftable to cut off the supply of aggregates between said supply and said receptacle, separate discharge means for each of said receptacles, latch means to hold the cut-off means in open position cooperating with said weighing means to release the cut-off to permit the same to move to cut off position, additional latch means for engaging said weighing instrumentalities to render them ineffective, means for actuating the discharge means for the receptacles, means for actuating the latch means for the weighing instrumentalities to permit them to return to their initial positions after the receptacles have been discharged, and a cooperative connection between the weighing instrumentalities and the cut-off valve to cause said cut-off valve to be shifted to open position.

30. In an aggregate supply apparatus for concrete mixers and the like, a plurality of weighing hoppers, charging means for each of said hoppers, discharge means for said hoppers, operative connections between said weighing hoppers and said charging means to render each of said charging means inoperative when a pre-determined weight of aggregate has been received thereby, and an actuating means for said discharge means rendered operative after all of said charging means have been rendered inoperable.

31. In an apparatus for producing standardized concrete, a mixing drum, a plurality of charging hoppers for said drum, supply means for said hoppers, weighing mechanisms associated with said supply means and said hoppers to cause a pre-determined quantity of aggregates to be delivered from said supply means to said hopper, discharge means for said hoppers, a control device associated with said mixing drum to control the time of mixing within the drum, means for causing discharge of the drum and subsequently causing discharge of the contents of the hoppers into the drum, moving the discharge device for the drum to non-discharging position, and setting the mixing time controlling device.

32. In a mixing machine for producing standardized concrete, a mixing drum, a discharge chute thereof, means for moving said discharge chute to discharging and non-discharging position, charging mechanism for supplying aggregates to said drum including a plurality of aggregate hoppers and supply means therefor provided with weighing means and discharging instrumentalities, a water receptacle associated with one of said hoppers to weigh a quantity of water receivable thereby, in proportion to the contents of the receptacle, latch means for the weighing means and for said receptacle to render them inoperative when said hoppers and said tank have received a pre-determined quantity of aggregates and water, and actuating means for the hopper and the tank discharge means.

33. In a machine for producing standardized concrete, a mixing drum, a means to discharge said drum after a pre-determined mixing period, charging instrumentalities for introducing into the drum in proper sequence pre-determined and proportioned quantities of all of the aggregates and the mixing water which are necessary for producing standardized concrete, supply means for supplying aggregates to the charging means, measuring devices associated with said supply and discharging instrumentalities to predetermine the quantity of aggregates received from said supply means, and an automatic control device for charging the mixer, returning the discharging means to non-discharging position and subsequently reloading the charging means with predetermined properly proportioned quantities of aggregates, cement and water.

34. In a machine for producing standardized concrete, a mixing drum, a means to discharge said drum after a predetermined mixing period, charging instrumentalities for automatically introducing into the drum in proper sequence predetermined and proportioned quantities of all of the aggregates and the mixing water which are necessary for producing standardized concrete, supply means for supplying aggregates to the charging means, measuring devices associated with said supply and charging instrumentalities to predetermine the quantity of aggregates and water received from said supply means.

35. In a machine for producing standardized concrete, a mixing drum, a means to discharge said drum after a predetermined mixing period, charging instrumentalities for automatically introducing into the drum in proper sequence predetermined and proportioned quantities of all of the aggregates and the mixing water which are necessary for producing standardized concrete, supply means for supplying aggregates to the charging means, measuring devices associated with said supply and charging instrumentalities to predetermine the quantity of aggregates and water received from said supply means, an automatic control device for charging the mixer, returning the discharge means to non-discharging position and subsequently actuating the supply means to reload the charging means with predetermined properly proportioned quantities of aggregates, cement and water.

36. In a machine for producing standardized concrete, a mixing drum, a means to discharge said drum after a predetermined mixing period, charging instrumentalities for automatically introducing into the drum in proper sequence predetermined and proportioned quantities of all of the aggregates and the mixing water which are necessary for producing standardized concrete, supply means for supplying aggregates to the charging means, measuring devices associated with said supply and charging instrumentalities to predetermine the quantity of aggregates and water received from said supply means, an automatic control device for charging the mixer, returning the discharge means to non-discharging position and subsequently actuating the supply means to reload the charging means with predetermined properly proportioned quantities of aggregates, cement and water, and safety means to prevent the charging of the mixer if improper proportions of aggregates are delivered to the charging means.

37. In a concrete mixing plant, in combination, a concrete mixing machine, a source of supply of at least one aggregate necessary to be charged into the machine for mixing, measuring means associated with the above parts for containing and measuring an aggregate supplied from the source of supply, means intermediate said measuring means and the mixer for charging the said aggregate into the mixer, means for discharging the mixer, devices controlling the periods of action of the various parts such that the measured supply of aggregate in the measuring means is immediately charged into the mixer when the discharging means of the latter is operated so as to avoid loss of time in bringing up said aggregate and making ready to charge it into the mixer, and instrumentalities for causing the means for charging the aggregate into the mixer, and the means for discharging the mixer to operate in mechanically timed relation so as to insure the production of a uniform product treated by the mixer, at each of its mixing operations.

38. In a concrete mixing plant for making uniform concrete, in combination, a concrete mixer, a measuring and storage means associated with the mixer to receive and hold at least one of the aggregates to be charged into the mixer ready to pass to the latter, supply means for keeping said hopper supplied with a measured quantity of the aggregate referred to, at all times, discharge means for the mixer, and charging devices intermediate the storage and measuring mixer and co-related in their timed action so that when the mixer is discharged, the aggregate in the measuring and storage means will be promptly charged into the mixer without loss of time, with means to maintain the various parts aforesaid acting under mechanical control so as to insure substantially the same treatment of the materials introduced into the mixer upon repeated operations of the latter and thus ensuring that said materials will be treated with a uniform time factor and substantially uniform amount of agitation in the mixer.

39. In a concrete mixing plant for making uniform concrete, in combination, a concrete mixer, main storage hopper for containing a large amount of at least one of the aggregates to be supplied to the mixer, a supplemental storage and measuring hopper arranged to receive the said aggregate from the main storage hopper for temporary storage of the aggregate after it has been received from the main storage hopper and in a measured condition, means whereby the supply of the aggregate in a relatively large amount may be maintained in the main storage hopper, means for periodically discharging the mixer at timed intervals, means for promptly discharging the measured quantity of aggregate in the measuring and storage hopper upon the discharge of the mixer and operating in timed relation to said discharge, and means for charging a measured quantity of the said aggregate into the measuring and storage hopper when it has been emptied.

40. A concrete mixing plant substantially as described in claim 39, combined with instrumentalities for causing the discharge of the aggregate from the main storage hopper into the supplemental measuring and storage hopper and in timed relation to the action of the latter by which it charges the mixer with the measured quantity of aggregate so that when the measuring hopper is discharged, it will be automatically refilled and ready for a subsequent charging operation of the mixer.

41. In a concrete mixing plant designed for making uniform concrete by continuing successive operations of the machinery, in combination, a concrete mixer, discharge means for the mixer, a source of supply of at least one aggregate necessary to be treated in the mixer, a measuring means for predetermining the quantity of the said aggregate to be charged into the mixer, means mechanically timed for operating the measuring means at periodic intervals to perform its charging function, and means for timing the action of the last mentioned means to effect the charging of the aggregate into the mixer in a timed relation with regard to the time of discharge of the mixer by its discharging means.

In testimony whereof I affix my signature.

JOHN F. ROBB.